United States Patent
Klein et al.

(10) Patent No.: US 11,732,828 B2
(45) Date of Patent: Aug. 22, 2023

(54) HOLDING ELEMENT AND TERMINAL CONNECTOR HAVING SUCH A HOLDING ELEMENT

(71) Applicant: VOSS AUTOMOTIVE GMBH, Wipperfürth (DE)

(72) Inventors: Roland Klein, Wipperfürth (DE); Eugen Heinrichs, Bergneustadt (DE)

(73) Assignee: Voss Automotive GmbH, Wipperfürth (DE)

( * ) Notice: Subject to any disclaimer, the term of this patent is extended or adjusted under 35 U.S.C. 154(b) by 814 days.

(21) Appl. No.: 16/318,612

(22) PCT Filed: Jul. 27, 2017

(86) PCT No.: PCT/EP2017/000908
§ 371 (c)(1),
(2) Date: Jan. 17, 2019

(87) PCT Pub. No.: WO2018/019422
PCT Pub. Date: Feb. 1, 2018

(65) Prior Publication Data
US 2019/0242509 A1    Aug. 8, 2019

(30) Foreign Application Priority Data

Jul. 29, 2016  (DE) .......................... 102016009168.1
Jul. 29, 2016  (DE) .......................... 102016015682.1

(51) Int. Cl.
*F16L 37/098* (2006.01)

(52) U.S. Cl.
CPC ....... *F16L 37/0982* (2013.01); *F16L 37/0985* (2013.01); *F16L 37/0987* (2013.01)

(58) Field of Classification Search
CPC ............... F16L 37/0982; F16L 37/0985; F16L 37/0987; F16L 37/12; F16L 37/121; F16L 37/123; F16L 37/133; F16L 37/138
See application file for complete search history.

(56) References Cited

U.S. PATENT DOCUMENTS

| 2,420,866 A | * | 5/1947 | Coss ....................... A47L 9/242 |
| | | | 285/7 |
| 4,915,421 A | | 4/1990 | Dennany Jr. |

(Continued)

FOREIGN PATENT DOCUMENTS

| CN | 101040142 A | 9/2007 |
| CN | 101644368 A | 2/2010 |

(Continued)

*Primary Examiner* — Matthew Troutman
*Assistant Examiner* — Fannie C Kee
(74) *Attorney, Agent, or Firm* — Hudak, Shunk & Farine Co. LPA

(57) ABSTRACT

A holding element for a terminal connector, having at least one socket part and at least one plug part, wherein the plug part can be inserted or is inserted in a socket portion of the socket part. The holding element can be plugged or is plugged onto the plug part for detachably holding the plug part in the socket part. The holding element has a holding element body, holding arms having latching lugs that are directed inwards with respect to the holding element, holding arms having latching lugs that are directed outwards with respect to the holding element, and axially on both sides, has an uninterrupted, continuous edge on the end side. The holding arms each have a free end that is spring-elastically movable in the radial direction, and an end opposite thereof that is fixed to the holding element body.

13 Claims, 9 Drawing Sheets

(56) References Cited

U.S. PATENT DOCUMENTS

| | | | |
|---|---|---|---|
| 5,219,188 A * | 6/1993 | Abe | F16L 37/0982 |
| | | | 285/319 |
| 5,924,746 A | 7/1999 | Fixemer | |
| 5,992,895 A * | 11/1999 | Steinkamp | F16L 37/0985 |
| | | | 285/45 |
| 6,349,978 B1 * | 2/2002 | McFarland | F16L 37/0985 |
| | | | 285/319 |
| 6,419,281 B1 | 7/2002 | Salomon-Bahls et al. | |
| 6,688,654 B2 | 2/2004 | Romero | |
| 7,874,595 B2 | 1/2011 | Lechner et al. | |
| 2009/0035055 A1 | 2/2009 | Rosch et al. | |
| 2016/0245441 A1 | 8/2016 | Klein et al. | |
| 2017/0152980 A1 | 6/2017 | Klein et al. | |

FOREIGN PATENT DOCUMENTS

| | | |
|---|---|---|
| DE | 8604217 U1 | 6/1988 |
| DE | 3924173 A1 | 1/1991 |
| DE | 20213806 U1 | 2/2004 |
| DE | 102004053538 A1 | 5/2006 |
| DE | 102009019395 A1 | 11/2010 |
| DE | 102013017442 A1 | 4/2015 |
| DE | 102014211844 A1 | 12/2015 |
| EP | 0999398 A1 | 5/2000 |
| EP | 0946841 B1 | 8/2002 |
| EP | 1369634 A1 | 12/2003 |
| EP | 2224156 A2 | 9/2010 |
| EP | 1106896 A1 | 6/2011 |
| FR | 2930621 A1 | 10/2009 |
| WO | 8909361 A1 | 10/1989 |
| WO | 2015058857 A2 | 4/2015 |
| WO | 2015180875 A1 | 6/2017 |

* cited by examiner

HOLDING ELEMENT AND TERMINAL CONNECTOR HAVING SUCH A HOLDING ELEMENT

FIELD OF THE INVENTION

The invention relates to a holding element for a connector which comprises at least one socket part and at least one plug part, wherein the plug part can be or is inserted into a socket portion of the socket part, wherein the holding element can be pushed or is pushed onto the plug part for releasably holding the plug part in the socket part, wherein the holding element has a holding element body, holding arms having latching lugs directed inwards relative to the holding element, holding arms having latching lugs directed outwards relative to the holding element, and an uninterrupted, continuous edge axially on both sides at the ends, and to a connector, in particular for hose lines and/or pipelines, comprising at least one socket part and at least one plug part, wherein the plug part can be inserted or is inserted into a socket portion of the socket part and wherein at least one such holding element is provided for releasably holding the plug part in the socket part.

BACKGROUND OF THE INVENTION

A very wide variety of connectors having a plug part and a socket part are known in the prior art. In order to secure the plug part in the socket part, it is known to provide holding elements for this purpose. A very wide variety of forms of such holding elements are known. For example, according to EP 0 999 398 B1, a plug-in connector for hose lines and/or pipelines consists of a socket part and a plug part, the plug part being inserted with a plug shaft into a receiving opening of the socket part. The inserted plug part is sealed relative to the socket part by a peripheral seal and is locked against being pulled out by a locking device. Inside the socket part there is arranged a hollow-cylindrical plug-in pin which engages axially into the inserted plug shaft. The locking device consists of at least two diametrically opposite latching arms of the plug part which extend axially in the release direction approximately parallel to the plug axis and are resilient in the axial direction, wherein the latching arms in the inserted state each engage in an interlocking manner behind an undercut surface formed in the receiving opening of the socket part. The locking device is formed in one piece with the plug part.

From DE 86 04 217 U1 there is known a further plug-in connector for pressure-medium lines, in particular for connecting brake lines to a brake valve body, which plug-in connector consists of a housing and a plug, having a through-opening, which can be inserted with its plug shaft into a connecting bore of the housing. The plug is held in the axial direction against displacement by means of a holding element and is sealed by means of a peripheral seal arranged between the plug shaft and the housing. The plug is fixed against rotation relative to the housing by an interlocking connection. The interlocking connection consists of two latching elements arranged on the periphery of the plug shaft and non-rotatably connected thereto, which latching elements, in the inserted state of the plug, latch into openings in the housing, the latching elements consist of latching tongues. The holding element consists of a bayonet catch, which is formed by a locking sleeve arranged on the plug shaft and the housing.

EP 2 224 156 A2 discloses a plug-in connector for media lines which comprises a plug part which can be inserted with a plug shaft in a sealing manner into a receiving opening of a connector counter-part and can be releasably locked relative thereto in a latching manner against being pulled out. The latching means consist of at least two latching arms of the plug part, which extend in the release direction approximately parallel to the insertion axis and are resilient in the radial direction. In the inserted state, the latching arms each engage in an interlocking or friction-based manner behind a latching step inside the receiving opening of the connector counter-part. The plug part is in the form of an integral, monolithic shaped part with the latching arms. The latching means are further so configured that different forces are to be overcome in the insertion and release directions. Disassembly is carried out by engaging end portions of the latching arms which protrude from the connector counter-part and are arranged adjacent to the plug part.

EP 1 106 896 B1 discloses a further plug-in connector for pressure-medium lines, which consists of a housing part and a plug part. The plug part is inserted with its plug shaft in a sealing manner into a receiving opening of the housing part and releasably blocked by means of a separate holding element having holding means which are resiliently movable in the radial direction. This is effected in that the holding element, in a blocking position, is seated with the holding means between an inner annular step in the receiving opening and an outer annular step of the plug shaft, wherein the holding element is so seated on the plug shaft, in order to be displaceable in the axial direction between a securing position and a freeing position, that the holding means in the securing position are blocked against a radial release movement and in the freeing position are freed for a radial release movement. Assembly and disassembly take place axially by an axial lifting movement by engaging the holding element by means of a release or lifting tool. Apart from the holding element, the provision of the spring element is necessary to permit the desired blocking.

From WO 2015/058857 A2 there is further known a connector comprising a socket part and a plug part, wherein the plug part is inserted into a receiving opening of the socket part and wherein a holding element is provided for releasably latching the plug part in the socket part. The holding element and the plug part are in two-part form, and the holding element is radially expandable and mounted in a captive and rotationally fixed manner on the receiving portion of the plug part. The holding element has at least one holding arm having a protruding holding lug on its outer surface, wherein the holding arm extends approximately parallel to the insertion axis of the plug part and can be moved resiliently in the radial direction relative to the plug part in order to latch the holding lug with a latching surface of the socket part or unlock it. For the guided engagement of a release tool with the holding element in order to release the connection between the plug part with the holding element and the socket part, guide surfaces or guide portions are provided on the holding element body adjacent to the free end of the at least one holding arm.

SUMMARY OF THE INVENTION

The object underlying the present invention is to further develop a holding element and a connector having such a holding element in such a manner that the latching state of the socket part and the plug part of the connector can be secured even better in order to make such a connector very reliable in particular when pressurized medium is being passed through the connector.

The object is achieved by a holding element according to the claims in that the holding arms each have a free end which is resiliently movable in the radial direction and an opposite end fixed to the holding element body. The object is further achieved for a connector having the features claimed. Further developments of the invention are defined in the dependent claims.

There are accordingly provided a holding element and a connector, wherein the connector comprises at least one socket part and at least one plug part which can be inserted into one another, wherein the plug part is inserted into a socket portion, having a receiving opening, of the socket part. The at least one holding element is either integral with the plug part or connected thereto, in particular by pushing on. It is mounted in a captive manner on a receiving portion of the plug part. The holding element can be radially expanded in at least one portion and has at least one holding arm having at least one protruding latching lug on its outer surface, wherein the at least one holding arm has a free end and an end fixed to the holding element body, that is to say the body of the holding element, and can be moved resiliently in the radial direction relative to the plug part. It is thereby possible to latch the at least one latching lug, which is arranged on the holding arm, on a latching surface or latching opening of the socket part or to release it from the latching position again. A further tool is not required for the release; instead, it can be effected by actuating an actuating element on the holding arm.

The plug part can on the one hand be in the form of a monolithic plug part, wherein the holding arms are arranged directly on the body of the plug part, in particular are formed in one piece therewith. It is further possible to form a separate holding element and to fit or push it axially onto a receiving portion of the plug part. The plug part and the holding element are then multi-part.

The holding element has holding arms having latching lugs which are directed inwards and holding arms having latching lugs which are directed outwards relative to the holding element. A combination of outwardly and inwardly directed latching lugs on the holding element and acting therewith not only serves as an anti-loss means but especially serves to latch the holding element on the plug part on the one hand and on the socket part on the other hand. The inwardly directed latching lugs thereby absorb the same forces as the outwardly directed latching lugs.

It is further found to be advantageous, in the case of a two-part configuration of the plug part and the holding element, to provide at least one of the two parts with an anti-rotation means in order to prevent the plug part and the holding element from unintentionally rotating relative to one another on assembly and during operation. In particular, the plug part can be in polygonal form on the outside in at least one portion in order to provide such an anti-rotation means. It is further possible that only the socket part or also the socket part has at least one anti-rotation means in order to allow the socket part to be fitted to the plug part in the desired orientation and positioning relative thereto. In particular, the socket part can have at least one protruding element and/or at least one surface and/or shaping that secures against rotation. Particularly advantageously, the plug part and/or the holding element which is fitted thereto or formed in one piece therewith has a corresponding counter-surface so that the surfaces of the socket part and the plug part, or the holding element thereon, that are in contact prevent the plug part and the socket part from rotating. This can also be provided by a complementary element, or a groove, cut-out or recess on the plug part or on the holding element, on the plug part or at the plug part, which interlocks with the at least one protruding element on the socket part and accordingly forms an anti-rotation means and/or positioning aid for the socket part relative to the plug part. Furthermore, the socket part can also have a groove, cut-out or recess or a corresponding undercut surface into which a correspondingly protruding element on the plug part or holding element engages in order thereby to form an anti-rotation means and/or positioning aid.

It is further found to be advantageous if the plug part, in particular the receiving part on the plug part for receiving the holding element, is provided with at least one device for pressure locking which cooperates with the holding element and prevents the holding element from being unlocked when there is pressure inside the connector. When a pressure lock is provided, it is sufficient to provide the connector having the at least one plug part and the at least one socket part, wherein the plug part can be inserted into the socket portion of the socket part, wherein the at least one holding element is provided for releasably holding the plug part in the socket part and wherein the plug part can be or is provided with the holding element. Particularly preferably, the pressure locking device comprises at least one element that protrudes from the outside of the receiving portion of the plug part, in particular at least one protruding pin or at least one protruding elevation. The holding element advantageously comprises at least one opening. This at least one opening is advantageously arranged in (at least) one of the holding arms of the holding element. Specifically when there is pressure inside the connector, for example due to the flow of pressurized medium through the connector, it is important that the plug part and the socket part are securely fixed to one another. When the plug part and the holding element are in the form of two parts which are fitted together, it is accordingly found to be advantageous to lock and secure the holding element via the pressure locking device, in particular one or more projecting elements on the receiving portion of the plug part, when there is media pressure inside the connector. A relative axial movement between the holding element and the plug part is brought about by applying pressure to the plug part. The plug part thereby moves axially in the counter-insertion direction, that is to say contrary to the insertion direction, while the holding element is fixed in an axially non-displaceable manner in the socket part. For pressure locking, the protruding element, as a result of displacement of the holding element relative to the plug part in the axial direction of the holding element, is advantageously located outside an opening in the holding element. A radial movement of the holding arm or holding arms is thereby blocked. Accordingly, the axial play of the holding element on the receiving portion of the plug part is advantageously such that the holding element is at least at a sufficient distance from the opening into which the at least one protruding element dips that the holding arms are not in a release position when the at least one protruding element is outside the opening. As a result of the axial displacement between the plug part and the holding element, the protruding elements are displaced out of the region of the opening(s) and thus block the holding arms radially.

The receiving portion of the plug part can further have edges and/or be in polygonal form and/or have projecting elements, such as rods, extending in the longitudinal direction of the plug part, which elements on the one hand interlock with correspondingly complementary surfaces or portions of the holding element and on the other hand effect an anti-rotation means for preventing the holding element from rotating on the receiving portion of the plug part.

It is further found to be advantageous if the socket part consists of at least one plastics material and is provided with the at least one latching opening on the lateral surface. Alternatively, the socket part can be in the form of a machined part, in particular consist of at least one metal, and be provided with at least one undercut surface as the latching surface for latching of the at least one latching lug of the at least one holding arm of the holding element. Accordingly, the socket part, when formed from at least one plastics material, advantageously has a latching opening on the lateral surface in order that the at least one latching lug of the at least one holding arm of the holding element, which has been or is arranged on the plug part, is able to engage therein. Alternatively, the socket part can be formed as a machined part of at least one metal. In this case, it advantageously has a latching surface, which is in particular an undercut surface, in order that the at least one latching lug of the at least one holding arm of the holding element, which is arranged on the plug part, can engage thereon. The plug part can accordingly be combined both with a socket part of a plastics material and with a socket part of at least one metal. The plug part can also consist of at least one plastics material or at least one metal. In particular, the socket part can further be in the form of a straight plug part or right-angle plug part or have any shape, including a bent shape. The holding element can in particular consist of at least one plastics material, but likewise of at least one metal or a combination of a plastics material and metal.

When a polygonal form, for example, in particular a tetragonal form, of the receiving portion of the plug part, on which the holding element is received or seated, is provided, the position of the holding element can be varied in 90° steps on the plug part or around the periphery thereof. This is found to be advantageous in particular when the connector has been or is arranged in an inaccessible manner, for example in a vehicle, in particular in a very confined space.

BRIEF DESCRIPTION OF THE DRAWINGS

In order to explain the invention in greater detail, exemplary embodiments thereof will be described hereinbelow with reference to the drawings, in which.

DETAILED DESCRIPTION OF THE INVENTION

Figure 1:
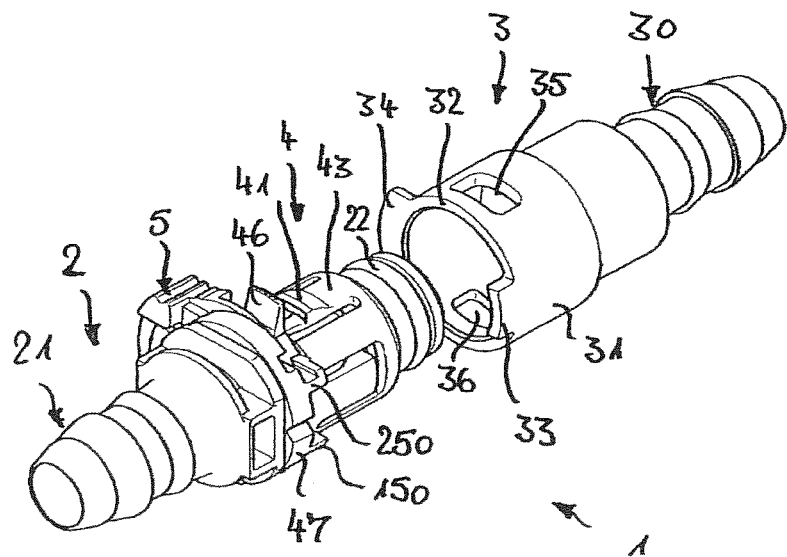
FIG. 1 is a perspective view of a connector according to the invention having a plug part having a holding element and having a socket part in the delivery state with the plug part not yet inserted into the socket part.

FIG. 1 shows a connector 1 which comprises a plug part 2, a socket part 3, a holding element 4, which is fitted to the plug part 2, and a locking device in the form of a radially insertable locking element 5 having a leg 53 and a leg 54. The connector 1 is shown in FIG. 1 in the so-called delivery state, that is to say in the preassembly state. The plug part 2 and the socket part 3 have not yet been inserted into one another, but the holding element 4 has been pushed onto a receiving portion 20 of the plug part 2. Apart from a receiving portion 20, the plug part 2 comprises a mandrel portion 21 via which a connection can be made in particular with a pipeline or hose line, which is not shown in FIG. 1. Such a pipeline or hose line is pushed at its end onto the mandrel portion 21, that is to say is fitted thereto by expansion. The socket part 3 also has a corresponding mandrel portion 30, in order to allow in particular a pipeline or hose line also to be fixed thereto by expansion.

The socket part 3 further has a socket portion 31 which receives the plug part 2 and is provided at the end with an axially protruding portion 33 arranged in the axial direction of the socket part 3 and protruding above the upper edge 32 of the socket portion 31 of the socket part 3, and with a portion 34 projecting radially from the upper edge 32 of the socket portion 31 approximately opposite the axially protruding portion 33. Offset by approximately 90° to the two portions 33, 34, the socket portion 31 of the socket part 3 has two mutually opposite window openings 35, 36 which serve as latching openings for latching lugs 40, 41 on the holding element 4. The latching lugs 40, 41 are arranged facing outwards on holding arms 42, 43 of the holding element 4, as can be seen not only in FIG. 1 but particularly clearly also in FIGS. 11a to 11l, in which the holding element 4 is shown in detail. The holding element 4, or the holding element body 44, has at its two mutually opposite ends a terminal continuous circumferential edge, namely at one end a continuous edge 148 and at the opposite other end of the holding element 4 or holding element body 44 a bead-like protruding terminal edge 47. The holding arms 42, 43 and 140, 141 are fixed alternately to one edge 148 and to the other edge 47, that is to say the holding arm 42 is fixed to the edge 148, the holding arm 140 is fixed to the edge 47, the holding arm 43 is fixed to the edge 148 and the holding arm 141 is fixed to the edge 47. Apart from the end 242, 243 fixed to the edge 148 or to the holding element body 44, the holding arms 42, 43 each have an opposite free end 142, 143 which is resiliently movable in the radial direction (relative to the holding element 4 or holding element body 44). The latching Rigs 40, 41 are arranged on the two holding arms 42, 43 not at the end but along the longitudinal extent thereof, in particular approximately in the middle region between the free end 142 or 143 and the fixed end 242, 243 of the holding arms 42, 43. Apart from the end 244, 245 fixed to the edge 47, the holding arms 140, 141 each likewise have an opposite free end 240, 241 which is resiliently movable in the radial direction (relative to the holding element 4 or holding element body 44).

An actuating element 45, 46 projects approximately radially outwards, that is to say away from the holding element body 44 of the holding element 4, at the end of each of the free ends 142, 143 of the holding arms 42, 43. By application of a force directed radially inwards relative to the holding element 4, the latching lugs 40, 41 can be brought from a latching position into an unlatched position in order to release the plug part with the holding element fitted thereto from the socket part, that is to say to move the latching lugs 40, 41 out of the latching openings or window openings 35, 36 and allow the plug part 2 to be removed axially from the socket part 3 or, conversely, the socket part 3 to be removed axially from the plug part 2.

Figure 12A:
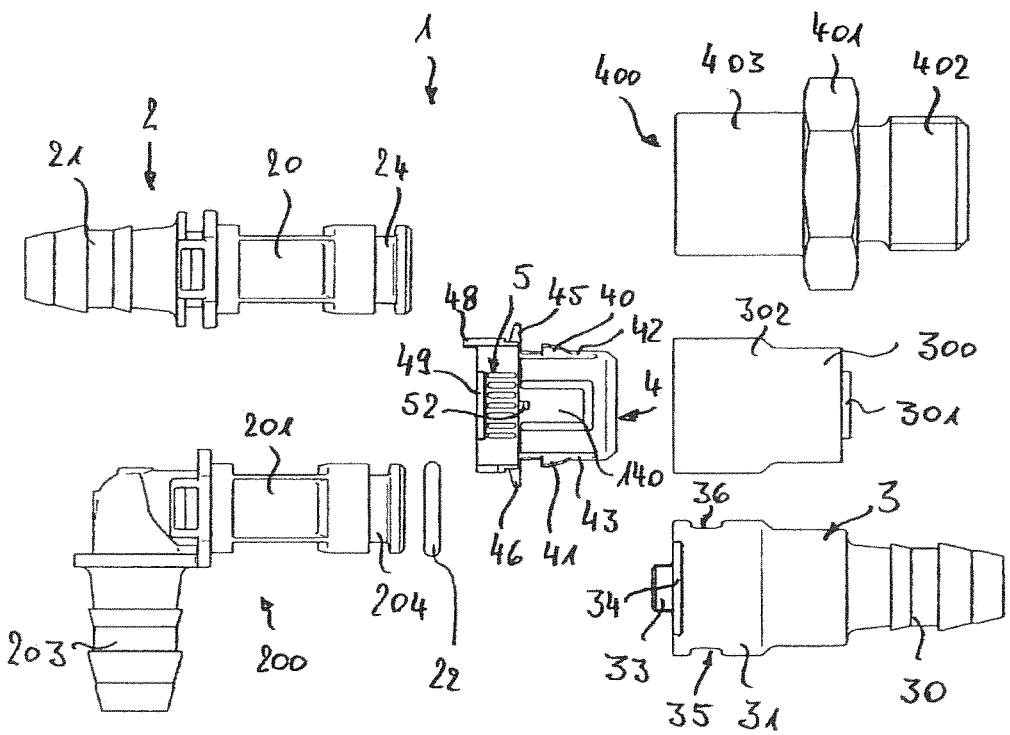
FIG. 12a shows a modular arrangement of a straight plug part according to the invention and of a right-angle plug part according to the invention having an O-ring as a sealing ring, of a holding element according to the invention for fitting to the respective receiving portion of the respective plug part, and of three different socket parts for combination with the plug parts.
Figure 12B:
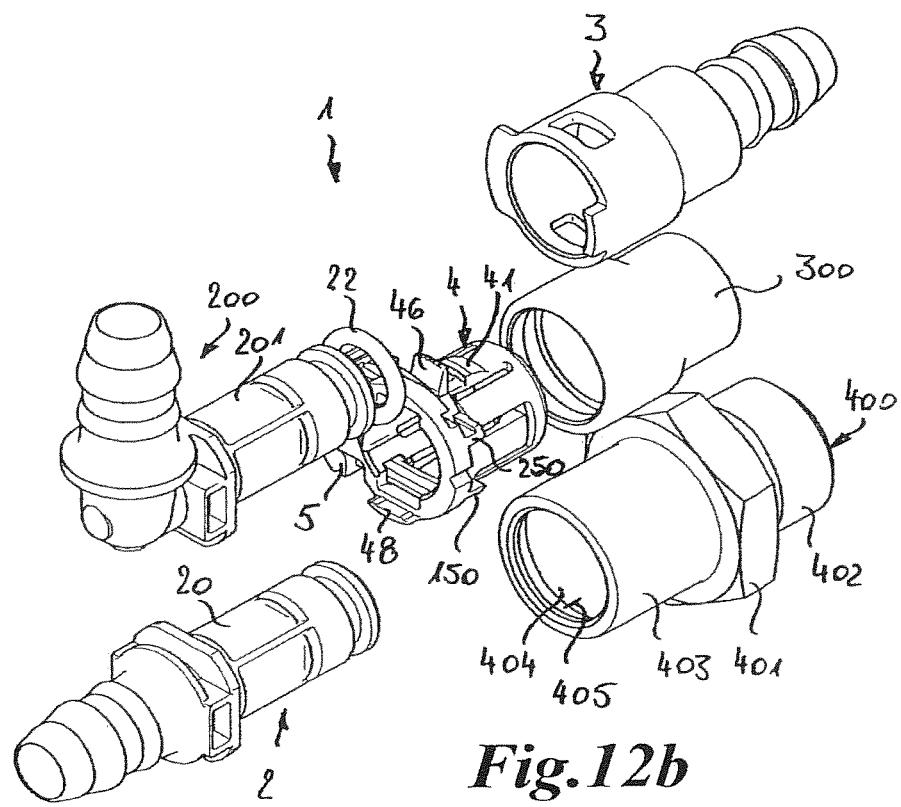
FIG. 12b is a perspective view of the modular arrangement of the two plug parts and three socket parts and also of the holding element according to FIG. 12a, FIG. 12c is a further perspective view of the modular arrangement of the two plug parts, three socket parts and of the holding element according to FIG. 12a, FIG. 12d is a further perspective view of the modular arrangement according to FIG. 12a, comprising the two plug parts and three socket parts and also the holding element.
Figure 12C:
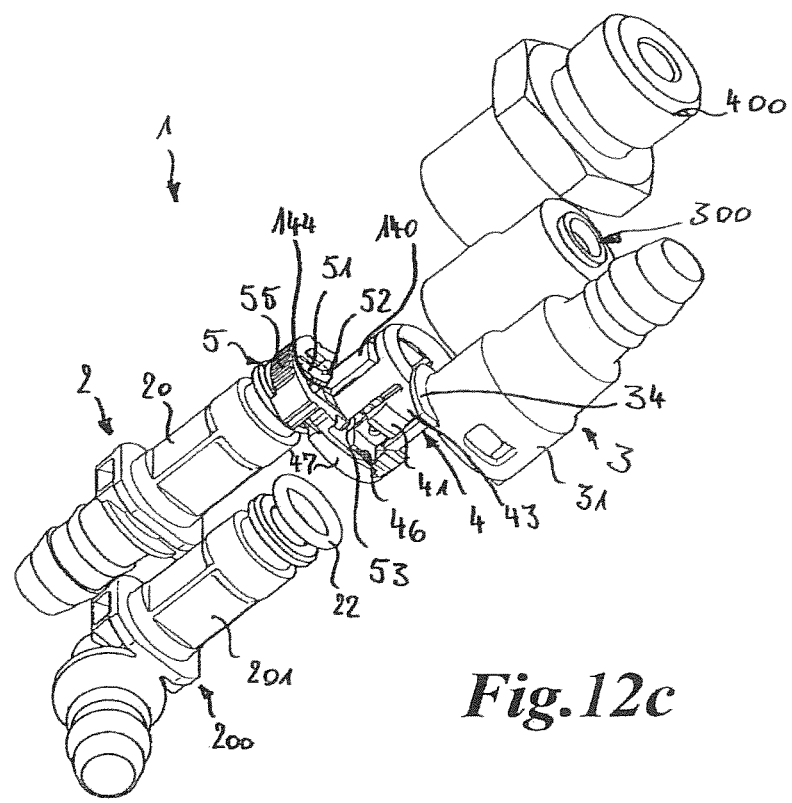
Figure 12D:
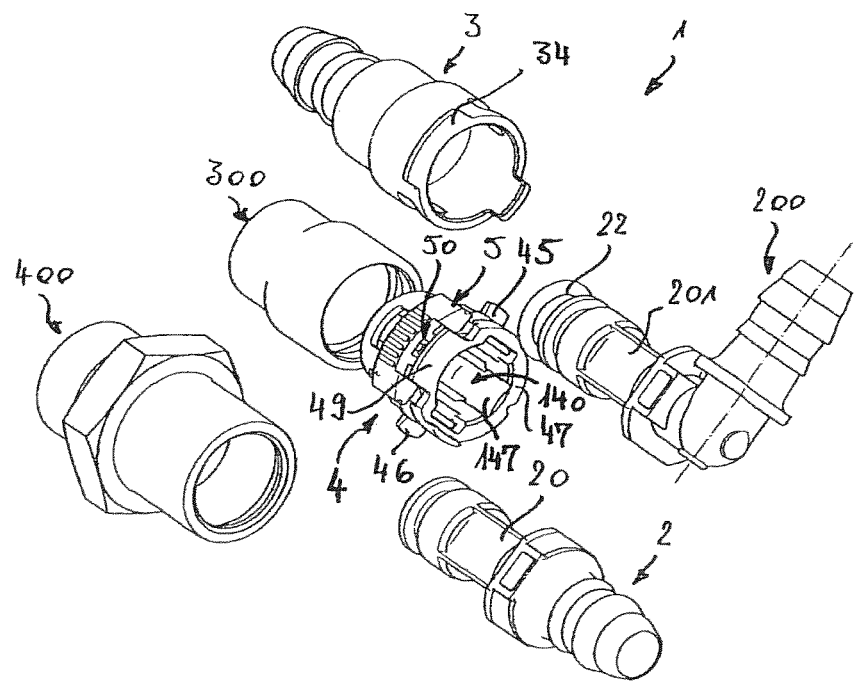

As can further be seen in particular in FIGS. 11a to 11l, the holding element 4 has the bead-like protruding terminal edge 47 adjacent to the respective actuating element 45, 46 but spaced apart therefrom. At the opposite end, the holding element 4 has the continuous edge 148. In the region of the actuating element 45, a portion 48 projects in the axial direction of the holding element 4 from the bead-like protruding terminal edge 47. Offset by approximately 90° thereto, that is to say between the two actuating elements 45, 46 or the corresponding holding arms 42, 43, that is to say at the location of the holding arm 140, adjacent to the fixed end 244 thereof, a radial portion 49 protrudes radially outwards from the bead-like protruding terminal edge 47. That radial portion serves for interlocking with the radially insertable locking element 5, which has a corresponding groove or cut-out 50 (see FIG. 12d) into which the radial portion 49 engages. Adjacent to the radial portion 49, two axial webs 149, 249 are arranged on the holding element body 44. On the side of the holding element body 44 opposite the radial portion 49, two corresponding axial webs 150, 250 protrude axially from the bead-like protruding terminal edge 47, as can be seen particularly clearly in FIG. 1 as well as FIGS. 11a and 11b. The spacing of the two axial webs 150, 250 from one another is in particular such that the axially protruding portion 33 at the upper edge 32 of the socket portion 31 of the socket part 3 is able to engage into that spacing in order to provide a positioning aid and also an anti-rotation means for the socket part 3 relative to the plug part 2 provided with the holding element 4.

In the region of the axial webs 149, 249 and 150, 250, the holding element body 44 is tongue-shaped and extends in the longitudinal direction or axial direction of the holding element body 44 as the holding arm 140 or 141 provided with the free end 240 or 241 already mentioned. The two holding arms 140, 141 also each have a latching lug 146, 147, which latching lugs are, however, directed inwards in the direction towards the receiving portion 20 of the plug part 2 (see in particular FIG. 11l). The latching lugs 146, 147 are arranged at the ends of the holding arms 140, 141, that is to say at the free ends 240, 241 of the two holding arms 140, 141. The holding arms 140, 141 are radially deflectable relative to the holding element 4 at their ends in the region of their free ends 240, 241 for latching on a latching surface or a latching shoulder or latching element of the plug part. By means of the latching lugs 146, 147, they are retained at a correspondingly shaped latching shoulder, or shoulder, or latching element, or element, on the outside of the receiving portion 20 of the plug part 2, come into engagement therewith (see, for example, FIG. 3a). As can be seen in FIG. 3a, the latching lugs 146, 147 of the two holding arms 140, 141 engage into the corresponding grooves or flattened portions on the periphery of the receiving portion 20 of the plug part 2 and are supported therein and on the surface thereof in the removal direction of the socket part 3 from the plug part 2 at a respective shoulder 26, 27 of the plug part 2, which delimits the receiving portion 20, or at a respective shoulder 206, 207 of the plug part 200 (see also FIGS. 5, 5a, 6, 6a). However, a certain degree of axial maneuverability or movability of the holding element 4 relative to the plug part 2 or on the receiving portion 20 thereof continues to be maintained.

The two holding arms 140, 141 with their inwardly facing latching lugs 146, 147 for retention on the plug part 2 or the receiving portion 20 thereof, and the two holding arms 42, 43 with their outwardly facing latching lugs 40, 41 for retention on the socket part 3 are accordingly arranged alternately over the periphery of the holding element 4, in each case offset by 90° relative to one another. The mutually opposite holding arms 140, 141 are thereby fixed to the edge 47 and the two mutually opposite holding arms 42, 43 are fixed to the edge 148. The free ends 240, 241 of the two holding arms 140, 141 extend almost as far as, and end at a distance from, the edge 148, arranged between the two fixed ends 242, 243 of the two adjacent holding arms 42, 43. The free ends 142, 143 of the two holding arms 42, 43 extend almost as far as, and end at a distance from, the edge 47, arranged between the two fixed ends 244, 245 of the two adjacent holding arms 140, 141, as can be seen in particular in FIGS. 11k and 11l.

At least the holding arm 140 has in the region between the two axial webs 149, 249 a through-opening 144 which is in the form of a small window. A blocking element 51 of the radially insertable locking element 5 is able to engage into this through-opening 144 and latch onto the edge bordering the through-opening 144 or be supported in the preassembly position on the outside of the holding arm 140 next to the through-opening 144. For this purpose, the blocking element 51 has a latching lug 52 at the end (see FIG. 12c).

The two mutually opposite holding arms 42, 43 are pressed radially in the direction towards the receiving portion 20 of the plug part 2 when the socket part 3 is pushed with its socket portion 31 onto the plug part 2 provided on its receiving portion 20 with the holding element 4. This can be seen in particular in FIG. 2. As it crosses the latching lugs 40, 41, the socket portion 31 presses the holding arms 42, 43, on which the latching lugs 40, 41 are arranged, radially in the direction towards the receiving portion 20 of the plug part 2. The actuating elements 45, 46 thereby also move radially in the direction towards the plug part or recede, so that they protrude less far above the outer extent of the holding element body 44 than in the preassembly position, which is shown in FIG. 1. This can be seen in particular by comparing FIGS. 2 and 1. It is thus possible to recognize visually and optionally also haptically by touch that an incomplete insertion operation of the plug part 2 and the socket part 3 is present here.

Figure 2:
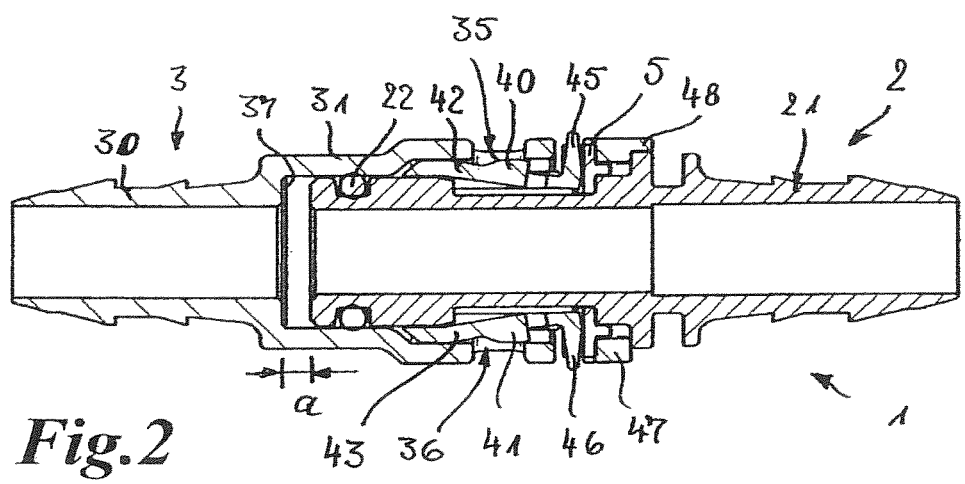
FIG. 2 is a longitudinal sectional view through the connector according to FIG. 1 in an incomplete pre-assembly or pre-insertion position of the plug part and the socket part with blocked holding arms of the holding element on the plug part.

In the still incomplete insertion position of the plug part 2 and the socket part 3 shown in FIG. 2, a sealing ring or O-ring 22, which is located on a terminal portion of the plug part 2 in a peripheral groove, which is inserted first and accordingly deeply into the socket portion 31 of the socket part 3, rests in a sealing manner on the inner surface of the socket portion 31 in that region, as can be seen particularly clearly in FIG. 2. It can also be seen in particular in that figure that the plug part 2 has not yet been inserted fully into the socket part 3, because the latching lugs 40, 41 are not yet able to latch into the latching openings 35, 36 of the socket portion 31 of the socket part 3.

Figure 3:
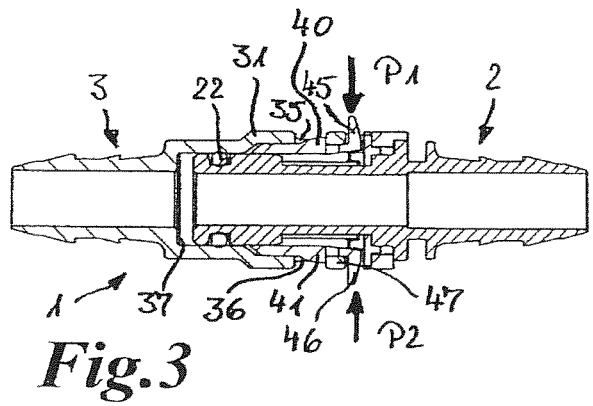
FIG. 3 is a longitudinal sectional view of the connector according to FIG. 1 in a fully inserted position of the plug part and the socket part with free holding arms of the holding element on the plug part.
Figure 3A:
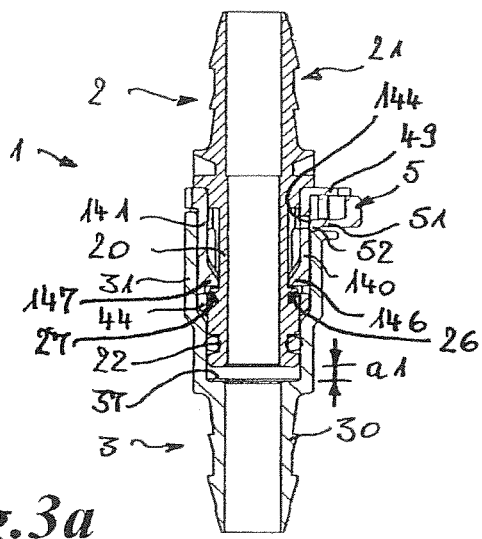
FIG. 3a is a further longitudinal sectional view of the connector according to FIG. 1 in a fully inserted position of the plug part and the socket part with free holding arms of the holding element on the plug part.

The fully inserted end position of the plug part 2 and the socket part 3 is shown in FIGS. 3 and 3a. This is already recognizable visually and haptically in particular from the actuating elements 45, 46 of the holding element 4 which again protrude radially far above the surface of the holding element 4. As can be seen in particular in FIG. 3, the latching lugs 40, 41 are in the latched position in the two latching openings 35, 36 in the socket portion 31 of the socket part 3. The latching lugs 40, 41 are supported in the latching openings 35, 36 and thus lock the assumed latching position of the plug part with the holding element 4 fitted thereto and the socket part 3. Because the socket portion 31 no longer presses radially against the latching lugs 40, 41 and thus the holding arms 42, 43, they are able to spring back into the starting position or preassembly position, as is also shown in FIG. 1, so that the actuating elements 45, 46 again protrude radially outwards far above the surface of the holding element body 44 arranged adjacent to the actuating elements 45, 46. This can be seen in particular in FIG. 3. The latched connection of the latching lugs 40, 41 in the latching openings 35, 36 of the socket portion 31 of the socket part 3 can be released by exerting a pressure radially in the direction towards the plug part 2, as indicated by the arrows P1 and P2. After the latching lugs 40, 41 have been threaded into and latched in the latching openings 35, 36 of the socket part 3, the holding element 4, which has been pushed onto the plug part 2, is held captively thereon and the insertion position of the plug part 2 with the holding element 4 and the socket part 3 is secured or blocked.

As can be seen in particular in FIGS. 3a and 3, a distance can continue to remain between the front side of the plug part 2, that is to say the portion of the plug part which is sealed by the O-ring 22 relative to the inside of the socket portion 31, and the shoulder 37 in the socket portion 31, which distance is denoted a1 in FIG. 3a. In FIG. 2, on the other hand, a denotes the distance of the front side of the plug part 2 from the inside of the socket portion 31, which arises on account of the unlatched, that is to say only incompletely inserted, position of the plug part and the socket part.

Figure 4:
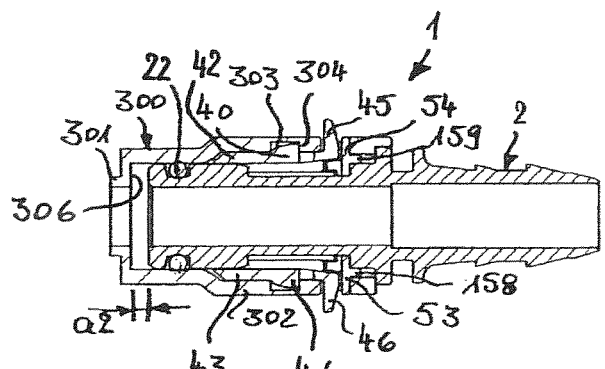
FIG. 4 is a longitudinal sectional view of a second embodiment of a connector according to the invention having a plug part and a socket part, wherein the socket part is in the form of a machined part, in a fully inserted position of the plug part and the socket part.

Unlike in the embodiment according to FIGS. 1 to 3a, the socket part 300 according to FIG. 4 is in the form of a machined part, in particular made of metal, and does not have a mandrel portion at the end. In its place, the socket part 300 is provided with a small fastening piece 301, for example for connection with a pipeline. Connection to a pipeline or also to a unit is thus possible via the fastening piece 301. The fastening piece 301 can be seen particularly clearly in section in FIG. 4. For connection to a pipeline, a unit, a machine, etc., different forms of connections of the connector 1 can be provided, such as a form as a socket part or portion, mandrel portion, threaded portion, etc. It is also possible to provide two coupling parts at the two sides/ends of the connector or of the socket part and/or of the plug part or of a connection in or to a machine with which the connector is to be connected.

Like the socket part 3, the socket part 300 has a socket portion 302 but, instead of the latching openings 35, 36 of the socket portion 31 of the socket part 3, it has an internal latching groove 303 with a latching surface 304. This can likewise be seen particularly clearly in FIG. 4. The latching lugs 40, 41 on the holding arms 42, 43 of the holding element 4, which is again arranged on the plug part 2, engage into the latching groove 303, whereby they are supported on the latching surface 304. Accordingly, the two actuating elements 45, 46 again protrude beyond the surface of the socket part 302 or the bead-like protruding terminal edge 47 of the holding element 4 on the plug part 2. The socket part 300 can, for example, consist of at least one metal, such as in particular aluminum, brass, steel or an alloy, such as an aluminum alloy. By contrast, the socket part 3, which is provided with the mandrel portion 30, can consist, for example, of a plastics material. The socket part, in both embodiments, can likewise consist of at least one plastics material or of at least one metal or of a combination of at least one plastics material and at least one metal. The plug part 2 can consist both of a plastics material and of a metal, such as aluminum or an aluminum alloy. The choice of material for the plug part and the socket part can be governed by the particular application, that is to say in particular the plug part and the socket part can consist of the same material or of different materials, in particular plastics material and/or metal. The holding element can also consist of one or more plastics material(s) and/or one or more metal(s).

Figure 10:
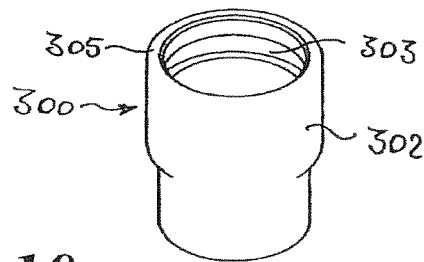
FIG. 10 is a perspective view of the socket part of the connector according to FIG. 4.
Figure 10A:
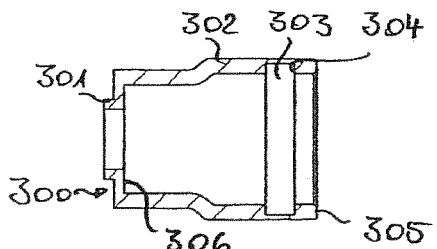
FIG. 10a is a longitudinal sectional view through the socket part according to FIG. 10, FIG. 11a to FIG. 11e are different perspective views of a holding element according to the invention for fitting to a receiving portion of a plug part of a connector.
Figure 11A:
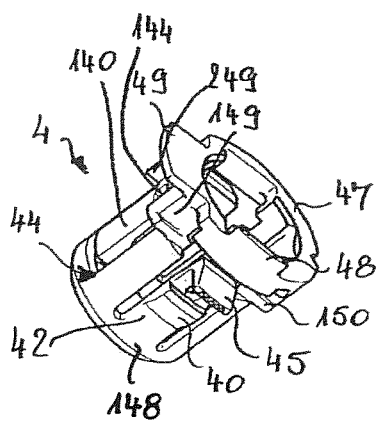
FIG. 11f is a top view of the holding element according to FIGS. 11a to 11e.
FIG. 11g is a first side view of the holding element according to FIGS. 11a to 11e.
FIG. 11h is a side view, rotated through 90° relative to the view in FIG. 11g, of the holding element according to FIGS. 11a to 11e.
FIG. 11i is a side view, rotated through 180° relative to the view in FIG. 11h, of the holding element according to FIGS. 11a to 11e.
FIG. 11j is a bottom view of the holding element according to FIGS. 11a to 11e.
FIG. 11k is a longitudinal sectional view of the holding element according to FIGS. 11a to 11e, cut along line D-D from FIG. 11j.
FIG. 11l is a further longitudinal sectional view of the holding element according to FIGS. 11a to 11e, cut along line E-E from FIG. 11j.
Figure 11B:
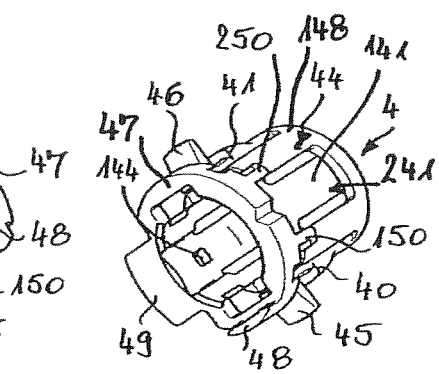
Figure 11C:
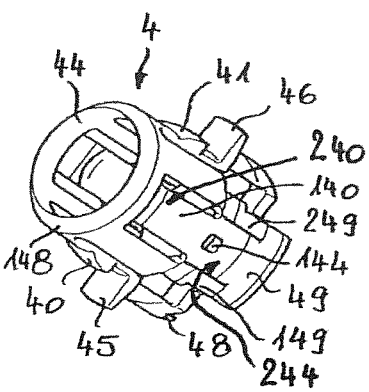
Figure 11D:
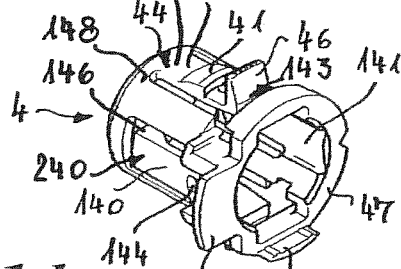
Figure 11E:
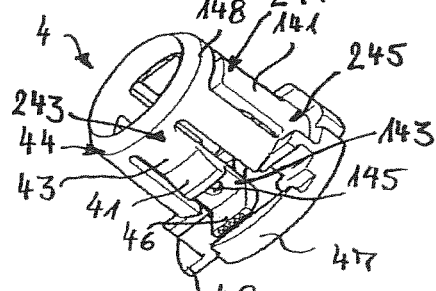
Figure 11F:
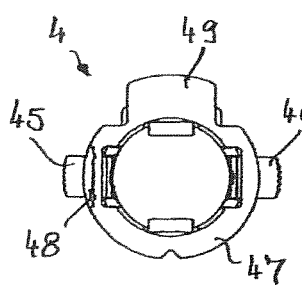
Figure 11G:
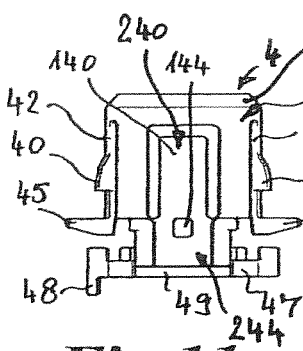
Figure 11H:
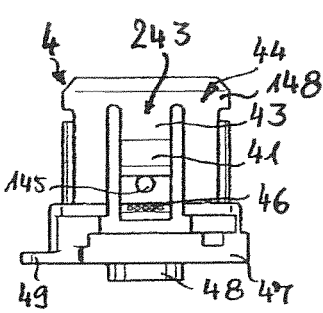
Figure 11I:
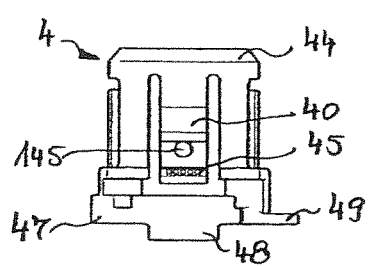
Figure 11J:
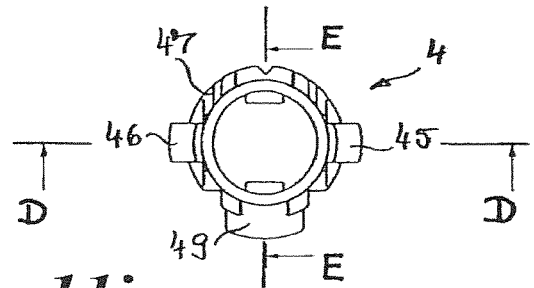
Figure 11K:
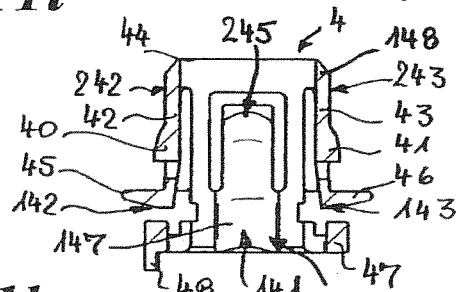
Figure 11L:
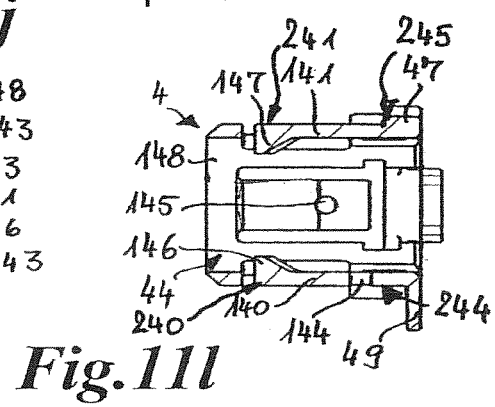

In the latched end position of the plug part 2 with the holding element 4 fitted thereto and the socket part 300, a distance a2 remains, at least in the embodiment shown, between the front side of the plug part 2, whereby the O-ring 22 on the plug part again serves to seal the plug part relative to the inner surface of the socket part 302, and a shoulder 306 in the socket part 300, as can be seen in FIG. 4 and FIG. 10*a*.

In each of the figures described hereinbefore, straight plug parts and straight socket parts are shown. FIGS. 5, 5*a* and 6, 6*a*, on the other hand, show right-angle plug parts 200. In each of FIGS. 7, 7*a* and 8, 8*a*, straight plug parts 2 are again shown. In all the plug parts 2 and 200, the receiving portion 20 or 201 is in each case polygonal in order to provide an anti-rotation means for the holding element 4 fitted thereto. However, it is likewise also possible to form the plug part 2 or 200 with a round cross-section in the region of its receiving portion 20 or 201. In particular when the provision of an anti-rotation means is not required there or when a different type of anti-rotation means is provided, the plug part can have a round cross-section throughout. Mixed forms of a round cross-section and flattened portions or at least one flattened portion are also possible along the peripheral surface in particular of the receiving portion 20 or 201 of the plug part 2 or 200.

Figure 5:
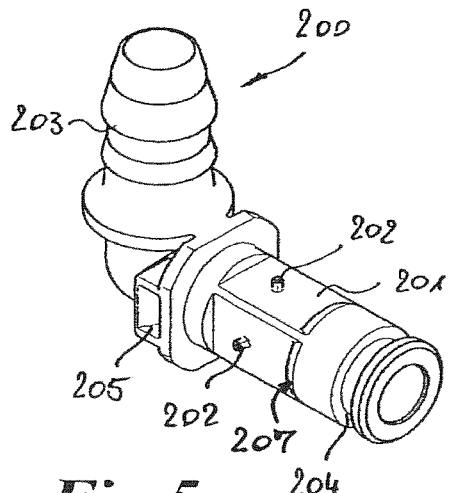
FIG. 5 is a perspective view of a right-angle plug part according to the invention which is provided in its receiving portion for receiving a holding element with protruding elements on the outer surface for forming a pressure locking device in combination with a holding element fitted thereto.
Figure 5A:
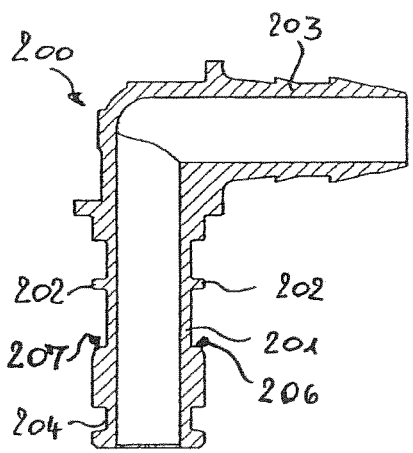
FIG. 5a is a longitudinal sectional view of the right-angle plug part according to FIG. 5.
Figure 6:
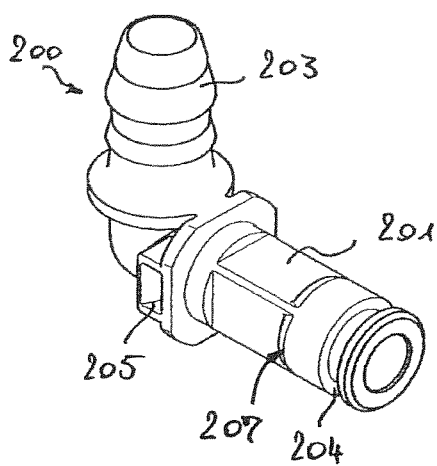
FIG. 6 is a perspective view of a further embodiment of a right-angle plug part according to the invention, in which the receiving portion for receiving a holding element is in polygonal form in order to provide an anti-rotation means for the holding element fitted thereto.
Figure 6A:
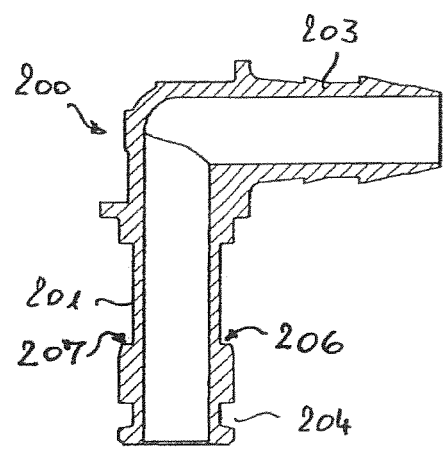
FIG. 6a is a longitudinal sectional view of the right-angle plug part according to FIG. 6.
Figure 7:
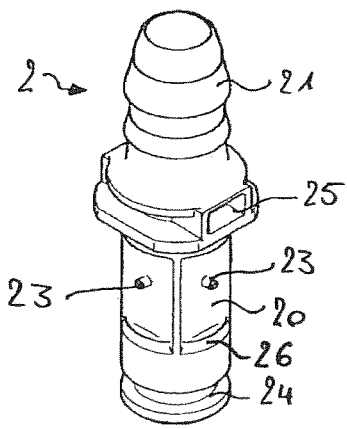
FIG. 7 is a perspective view of a plug part in the form of a straight plug part having a protruding elements provided with protruding elements for forming a pressure locking device in conjunction with a holding element fitted to the receiving portion of the plug part.
Figure 7A:
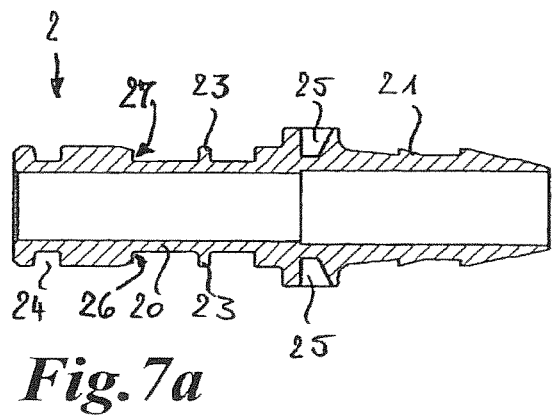
FIG. 7a is a longitudinal sectional view through the plug part according to FIG. 7.
Figure 8A:
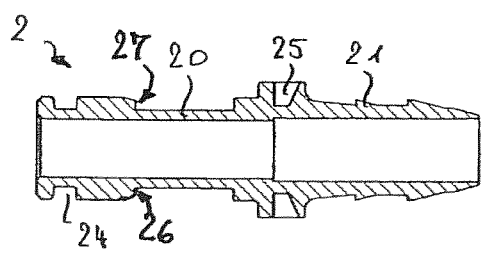
FIG. 8a is a longitudinal sectional view through the plug part according to FIG. 8.
Figure 8:
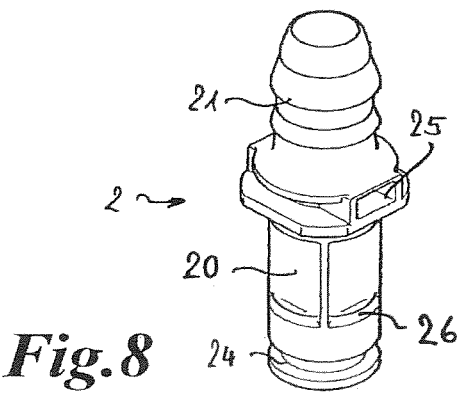
FIG. 8 is a perspective view of a straight plug part having a polygonal receiving portion for forming an anti-rotation means for a holding element fitted thereto.
Figure 9:
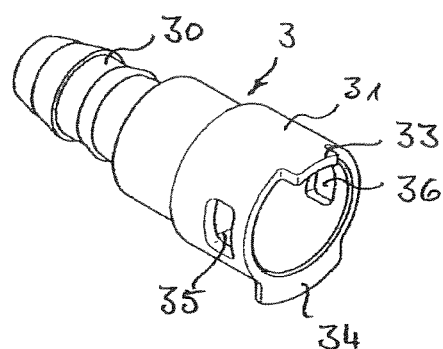
FIG. 9 is a perspective view of the socket part of the connector according to FIG. 1.
Figure 9A:
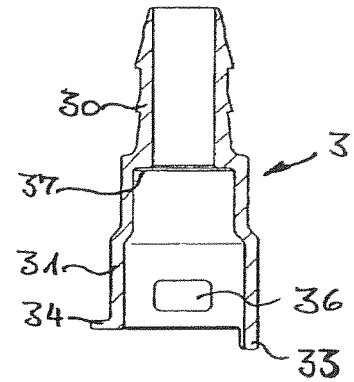
FIG. 9a is a longitudinal sectional view through the socket part according to FIG. 9.
Figure 13A:
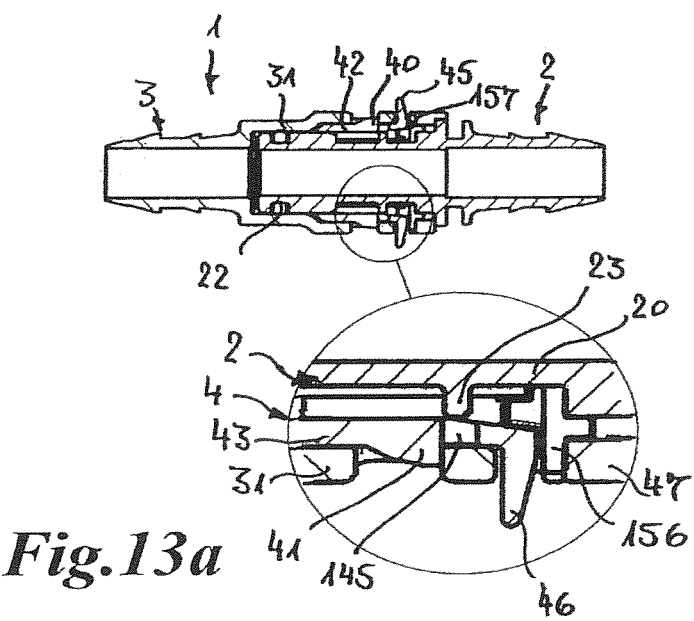
FIG. 13a is a longitudinal sectional view of a connector according to the invention according to FIG. 1, wherein the connector is in a released pressure locking position and wherein, in order to illustrate the free position of the pressure lock, a detail in the region of the holding arms of the holding element is shown on an enlarged scale.
Figure 13B:
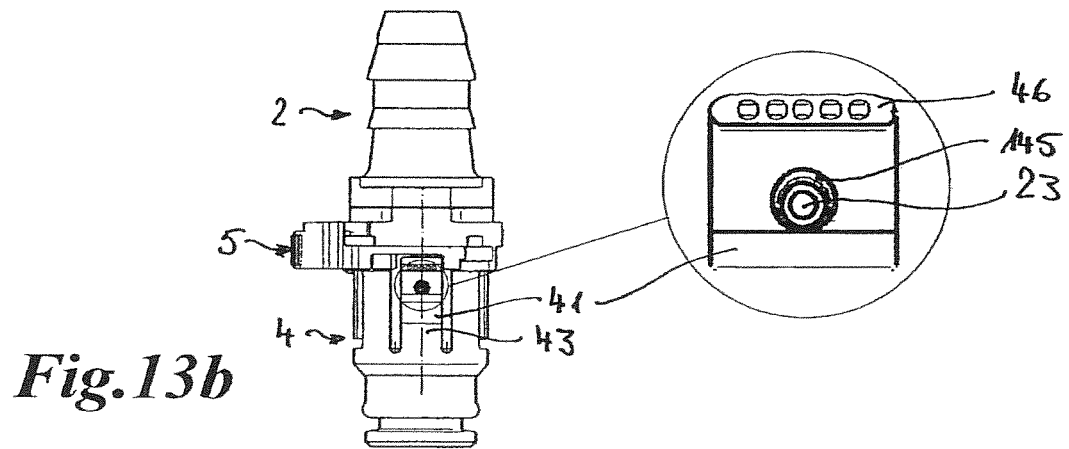
FIG. 13b is a side view of the connector according to FIG. 13a, wherein, in order to illustrate the free position of the pressure lock, a detail in the region of a holding arm of the holding element is shown on an enlarged scale.
Figure 14A:
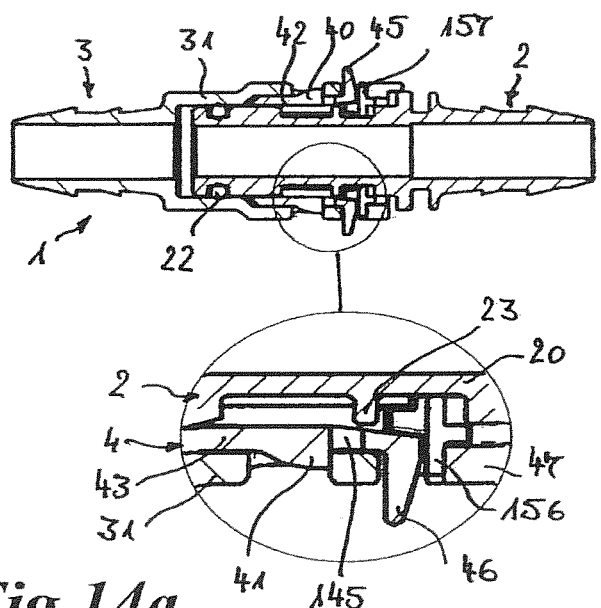
FIG. 14a is a longitudinal sectional view of a connector according to the invention in the embodiment according to FIG. 1, wherein an enlarged detail view in the region of the blocked pressure locking device is additionally shown.
Figure 14B:
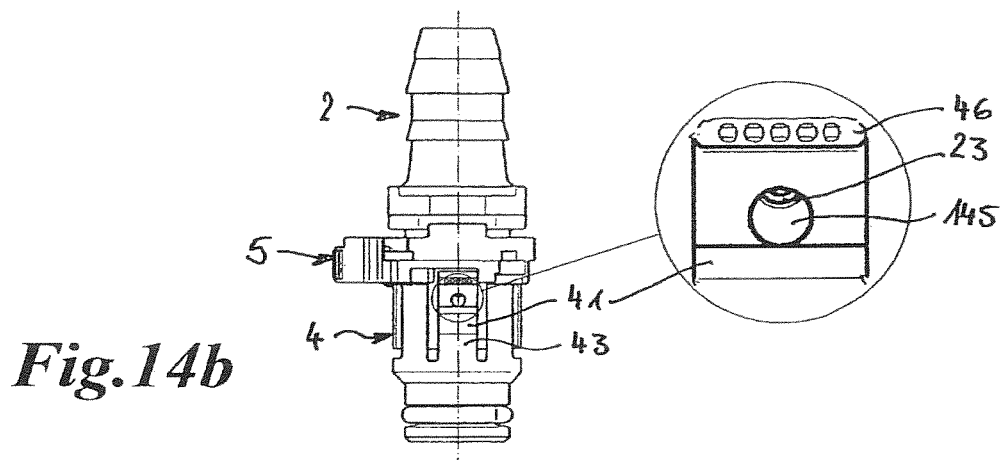
FIG. 14b is a side view of the connector according to FIG. 14a, wherein an enlarged detail view in the region of the blocked pressure locking device is additionally shown.

In the plug part 200 according to FIG. 5 and the plug part 2 according to FIG. 7, protruding pin elements 23 and 202 are provided on each of the four surfaces of the respective polygonal receiving portion 20 and 201. The protruding pin elements 23 and 202 serve to provide a pressure lock when there is pressure inside the plug part 2 or 200, that is to say when pressurized medium is flowing through the plug part. For pressure locking, the protruding pin elements 23, 202 are located outside a respective opening 145 in the holding arms 42, 43, as a result of displacement of the holding element 4 relative to the plug part 2 in the axial direction of the holding element 4. A radial movement of the holding arms 42, 43 is thereby blocked, as is shown in FIGS. 14*a* and 14*b*. The axial play of the holding element 4 on the receiving portion 20 of the plug part 2 that is provided is thus such that the holding element is at least sufficiently far away from the opening 145 into which the at least one protruding pin element 23, 202 dips, so that the holding arms 42, 43 are then not in a release position when the protruding pin element 23, 202 is situated outside the opening 145. As a result of the axial displacement between the plug part 2 and the holding element 4 that occurs when there is pressure inside the connector 1, the protruding pin elements 23, 202 are displaced out of the region in which they are aligned with the openings 145 and thus block the holding arms 42, 43 radially. Actuation of the holding arms 42, 43 in order to release their latching lugs 40, 41 from latching in the latching openings 35, 36 in the socket part 3 is thus prevented in that position. Only when the holding element 4 and the plug part 2 are in the position in which they are not axially displaced are the protruding pin elements 23, 202 able to dip into the openings 145 and thus actuation of the holding arms 42, 43 is possible only when there is no media pressure inside the connector 1. The openings 145 in the two holding arms 42, 43 can be seen in particular in FIGS. 11*e*, 11*h*, 11*i* and 11*l*. Such a freed pressure lock is shown in FIGS. 13*a* and 13*b*, while FIGS. 14*a* and 14*b* show a blocked pressure lock in which the protruding pin elements 23 and 202 are not able to dip into the respective opening 145 in the two holding arms 42, 43. For a pressure lock, axial movability of the holding element relative to the plug part is thus provided. When there is no media pressure inside the connector, it is possible to release the plug part from the socket part. By manually inserting the plug part 2 as far as the stop, that is to say into the furthest possible position inside the socket part, manual unlocking of the latching lugs 40, 41 of the holding arms 42, 43 from their latching in the latching openings 35, 36 can take place.

Apart from the right-angle shape, the plug parts 2 and 200 according to FIGS. 5, 5*a*, 6, 6*a*, 7, 7*a* and 8, 8*a* do not differ from one another, because all the plug parts are designed for the expansion fitting in particular of pipelines or hose lines and accordingly each have a mandrel portion 21 or 203.

As can be seen from the plug parts 2 to 200 in FIGS. 5 to 8*a* but also from the other plug parts in the figures already described hereinbefore, those plug parts each have not only a receiving groove 24 or 204 for receiving the sealing ring or O-ring 22 at one end, but also a respective engagement opening or two mutually opposite engagement openings 25, 205 between the receiving portion 20 or 201 and the respective mandrel portion 21 or 203. These engagement openings serve for engagement, for example, by a robot arm for carrying out automated assembly of the connector 1. Instead of such engagement openings 25, 205, other engagement surfaces may also be provided which can be gripped by robots or engaged during automated assembly in order on the one hand to provide the respective plug part 2 or 200 with the respective holding element 4 and on the other hand to permit correct assembly of the holding element 4 on the plug part, as well as subsequently correct assembly of the radially insertable locking element 5 on the holding element 4 and optionally also of the respective socket part 3 or 300 on the plug part with the holding element and the radially insertable locking element.

FIGS. 9, 9*a* and 10, 10*a* again show the socket part 3 and the socket part 300 on their own. In the socket part 300, the fastening piece 301 arranged at the end can clearly be seen, as can the latching groove 303 provided inside the socket portion 302 with its latching surface 304 for engagement of a respective latching lug 40 or 41 of the holding arms 42, 43 of the holding element 4, which is fitted to the respective plug part 2 or 200. It is likewise apparent, when the socket part 3 is compared with the socket part 300, that, in the case of the socket part 300 in the form of a machined part made of metal, portions do not project either radially or axially from the upper edge 305, thus interlocking with corresponding grooves or webs, such as the axial webs 150, 250, is not provided. The reason for this is in particular that there are no latching openings in the form of window openings 35, 36 through which the latching lugs 40, 41 must engage as exactly as possible in order to effect latching of the latching lugs 40, 41 thereon, but instead the latching groove 303 is provided, which is provided all round the inside of the socket portion 302 so that the particular position of the latching lugs 40, 41 along the latching groove 303, based on the peripheral extent thereof, is random. The situation is different, as already discussed hereinbefore, with the socket part 3 provided with window openings or latching openings 35, 36, in which both the axially protruding portion 33 and the radially projecting portion 34 ensure correct positioning of the socket part 3 on the plug part 2 or plug part 200 with the holding element 4 fitted thereto.

FIGS. 12a to 12d show, in the manner of a modular system, the various types of plug parts and socket parts which can be combined with one another as desired. For latching the plug part and the socket part, the holding element 4 is provided in each case and, for the additional blocking of the latched position of the plug part with the holding element and the socket part, the radially insertable locking element 5 is provided on the holding element 4. For sealing the plug part 2 or 200 in the respective socket part, the sealing ring or O-ring 22 is further also shown.

Instead of the socket parts 3 with a mandrel portion 30 and the socket part 300 in the form of a machined part which have already been described above, FIGS. 12a to 12d additionally show the variant of a socket part 400 having a hexagonal portion 401, wherein the socket part 400 is intended for screw connection with a pipeline or a unit, wherein engagement and holding during screwing on of the socket part 400 is accordingly possible via the hexagonal portion. For connection to a pipeline, the socket part 400 has a connecting portion 402. Connection with the plug part 2 or 200 with the holding element 4 fitted thereto is again possible via a socket portion 403. The socket portion 403, corresponding to the socket portion 302 of the socket part 300, likewise has a latching groove 404 with a latching surface 405 for the latching of the latching lugs 40 and 41 on the holding arms 42 and 43 of the holding element 4.

Accordingly, the three variants of socket parts 3, 300 and 400 can be combined, for example, with one of the variants of plug parts 2 and 200. In FIGS. 12a to 12d, the plug parts 2 and 200 are each shown without protruding pin elements 23 and 202. However, these may likewise be arranged on the respective receiving portions 20 and 201 in order to provide a pressure lock.

In addition to the variants of connectors described hereinbefore and shown in the exemplary embodiments, which are intended in particular for hose lines and/or pipelines, and holding elements therefor, many further variants can also be formed, including any desired combinations of the features mentioned hereinbefore of the respective holding elements and connectors, in which in each case at least one socket part and at least one plug part are provided, wherein the plug part can be inserted or is inserted into a socket portion of the socket part and wherein the holding element is provided for releasably locking the plug part into the socket part, wherein the holding element can be mounted or is mounted captively on a receiving portion of the plug part and has at least one portion which is radially expandable and comprises at least one holding arm which is provided with at least one protruding latching lug on its outer surface, wherein the holding arm is movable resiliently in the radial direction relative to the plug part in order to be able latch the at least one latching lug on at least one latching surface or latching opening of the socket part and to release it from the latching position again. The holding element for such a connector has been or is pushed onto the plug part for releasably holding the plug part in the socket part and has a holding element body, holding arms having latching lugs directed inwards relative to the holding element, which serve for fastening to the plug part, holding arms having latching lugs directed outwards relative to the holding element, which serve for connection to the socket part, and an uninterrupted, continuous edge axially on both sides at the ends, wherein the holding arms each have a free end which is resiliently movable in the radial direction and an opposite end fixed to the holding element body, and the fixed ends of the holding arms are each fastened or fixed alternately at the two continuous terminal edges of the holding element, wherein adjacent holding arms are not fastened at their fixed ends to the same continuous terminal edge but one holding arm is fastened or fixed to one terminal continuous edge and the other is fastened or fixed to the opposite other terminal continuous edge.

LIST OF REFERENCE NUMERALS 1 connector
2 plug part
3 socket part
4 holding element
5 radially insertable locking element
20 receiving portion
21 mandrel portion
22 sealing ring/O-ring
23 protruding pin element
24 receiving groove
25 engagement opening
26 shoulder
27 shoulder
30 mandrel portion
31 socket portion
32 upper edge
33 axially protruding portion
34 radially projecting portion
35 window opening/latching opening
36 window opening/latching opening
37 shoulder
40 latching lug
41 latching lug
42 holding arm
43 holding arm
44 holding element body
45 actuating element
46 actuating element
47 bead-like protruding terminal edge
48 protruding portion
49 radial portion
50 groove/cut-out
51 blocking element
52 latching lug
53 leg
54 leg
55 transverse portion
140 holding arm 141 holding arm
142 free end
143 free end
144 through-opening
145 opening
146 latching lug on 140
147 latching lug on 141
148 continuous edge
149 axial web
150 axial web
156 anti-loss portion
157 anti-loss portion
158 guide web
159 guide web
200 right-angle plug part
201 receiving portion
202 protruding pin element
203 mandrel portion
204 receiving groove
205 engagement opening
206 shoulder
207 shoulder
240 free end
241 free end
242 fixed end
243 fixed end
244 fixed end
245 fixed end
249 axial web
250 axial web
300 socket part
301 fastening piece
302 socket part
303 latching groove
304 latching surface
305 upper edge
306 shoulder in socket part
400 socket part
401 hexagonal portion
402 connecting portion
403 socket portion
404 latching groove
405 latching surface
a distance between front side of plug part 2 and shoulder 37 in socket part 3 in the unlatched position
a1 distance between front side of plug part 2 and shoulder 37 in socket part 3 in the end position
a2 distance between front side of plug part 2 and shoulder 306 in socket part 300 in the end position
P1 pressure
P2 pressure

What is claimed is:

1. A connector, comprising:
    at least one socket part,
    at least one plug part, wherein the plug part can be inserted or is inserted into a socket portion of the socket part, and
    at least one holding element can be pushed or is pushed onto the plug part for releasably holding the plug part in the socket part, wherein the holding element comprises:
        a holding element body, first holding arms having latching lugs directed inwards relative to the holding element, second holding arms having latching lugs directed outwards relative to the holding element, and an uninterrupted, continuous terminal edge axially on both sides at the ends,
        wherein the first holding arms and the second holding arms each have a free end which is resiliently movable in a radial direction and an opposite end which is fixed to the holding element body,
    wherein the holding element is undetachably mounted on a receiving portion of the plug part;
    wherein an actuating element for releasing the plug part from the socket part projects radially outwards at terminal free ends of the second holding arms having the latching lugs directed outwards relative to the holding element, and
    wherein the second holding arms WU are resiliently movable in the radial direction relative to the plug part in order to latch the latching lugs directed outwards relative to the holding element on at least one latching surface or a latching opening of the socket part and to release it therefrom.

2. The connector as claimed in claim 1, wherein the plug part is provided with at least one device for pressure locking which cooperates with the holding element, which device prevents the holding element from being unlocked when there is media pressure inside the connector.

3. The connector as claimed in claim 2, wherein the pressure locking device comprises at least one element projecting from the outside of the receiving portion of the plug part and the holding element comprises at least one opening in at least one of its the second holding arms.

4. The connector as claimed in claim 3, wherein for pressure locking, the projecting element is located outside an opening in the holding element by displacement of the holding element relative to the plug part in the axial direction of the holding element and hereby blocks a radial movement of the second holding arm or of the second holding arms.

5. The connector as claimed in claim 3, wherein the at least one element projecting from the outside of the receiving portion of the plug part is at least one projecting pin or at least one projecting elevation.

6. The connector as claimed in claim 2, wherein the receiving portion on the plug part is provided with the at least one device for pressure locking.

7. The connector as claimed in claim 1, wherein when the plug part and the holding element are in two-part form, at least one of the two parts is provided with an anti-rotation means, and/or the receiving portion of the plug portion has projecting elements extending in the longitudinal direction of the plug part, which interlock with correspondingly complementary surfaces or portions of the holding element and provide an anti-rotation means for preventing the holding element from rotating on the receiving portion of the plug part.

8. The connector as claimed in claim 7, wherein the plug part has edges and/or is in polygonal form on the outside in at least one portion.

9. The connector as claimed in claim 1, wherein the socket part has at least one anti-rotation means and/or positioning aid.

10. The connector as claimed in claim 9, wherein the socket part has at least one projecting element and/or at least one surface or shaping which secures against rotation or incorrect positioning.

11. The connector as claimed in claim 1, wherein the socket part consists of at least one plastic material and is provided with the at least one latching opening in a lateral surface, or is in the form of a machined part and is provided with at least one undercut surface as a latching surface for latching of the latching lugs of the second holding arms of the at least one holding element.

12. The connector as claimed in claim 11, wherein the machined part is made of at least one metal.

13. A hose line or pipeline including the connector according to claim 1.

* * * * *

UNITED STATES PATENT AND TRADEMARK OFFICE
CERTIFICATE OF CORRECTION

| | | |
|---|---|---|
| PATENT NO. | : 11,732,828 B2 | Page 1 of 1 |
| APPLICATION NO. | : 16/318612 | |
| DATED | : August 22, 2023 | |
| INVENTOR(S) | : Roland Klein et al. | |

It is certified that error appears in the above-identified patent and that said Letters Patent is hereby corrected as shown below:

In the Claims

In Claim 1, Column 16, Line 12, delete "WU".

In Claim 3, Column 16, Line 28, delete "its".

Signed and Sealed this
Third Day of October, 2023

Katherine Kelly Vidal
*Director of the United States Patent and Trademark Office*